(12) United States Patent
Avitabile et al.

(10) Patent No.: US 8,886,732 B2
(45) Date of Patent: Nov. 11, 2014

(54) OUT-OF-OFFICE CALENDAR AGGREGATOR

(75) Inventors: John W. Avitabile, Dallas, TX (US);
Christopher E. Maylor, Bedford, TX (US); Charles W. Christensen, Euless, TX (US); Laurie E. Chessie, Bedford, TX (US); Rachel Knickmeyer, Carrollton, TX (US); Radoslaw Wilk, Irving, TX (US); Crystal Branner, Euless, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 640 days.

(21) Appl. No.: 13/191,508

(22) Filed: Jul. 27, 2011

(65) Prior Publication Data
US 2013/0031184 A1    Jan. 31, 2013

(51) Int. Cl.
*G06F 13/00* (2006.01)
*G06Q 10/10* (2012.01)

(52) U.S. Cl.
CPC ..................................... *G06Q 10/10* (2013.01)
USPC ............................................................ 709/206

(58) Field of Classification Search
CPC ...................................................... G06Q 10/10
USPC ............................................................ 709/206
See application file for complete search history.

(56) References Cited

U.S. PATENT DOCUMENTS

2011/0004503 A1*   1/2011   Farrell et al. ..................... 705/9

* cited by examiner

*Primary Examiner* — Robert B Harrell

(57) ABSTRACT

A computing device receives and stores configuration data for out-of-office calendar events and information for an employee out-of-office event. The computing device generates, in response to the receiving the information for the employee out-of-office event, a notification message for a manager, wherein the notification message is based on the configuration data and the information for an employee out-of-office event. The computing device receives a request to present an out-of-office calendar for a portion of an organization associated with the employee and sends, to a user device, a calendar with the stored information for the employee out-of-office event that is responsive to the request to present the out-of-office calendar.

20 Claims, 12 Drawing Sheets

FIG. 6

Out-of-Office
CONSOLIDATED

ORGANIZATION
Consolidated Caler
-Group Leader1
+ Team leader1
+ Team leader2
- Team leader3
  Sub-leader1
  Sub-leader2
  Sub-leader3
  Sub-leader4
  Sub-leader5
  Sub-leader6
+ Team leader4
+ Team leader5
+Group Leader2
+Group Leader3

TIME POLICIES
2011 Holiday Sche
Vacation Policy
Paid & Unpaid Tim
Off
Family Medical Leave Submit an Out-of-Office Notification ◁ June 2011 ▷

| Saturday | Sunday |
|---|---|
| 4 | 5 |
| 11 | 12 |
| 18 | 19 |
| 25 | 26 |
| 2 | 3 |

Export Data

Out-of-Office Notification Form

Employee: Jennifer Delta ▽

Group: --- Select Group --- ▽

Start: --- Select Date --- ▽

End: --- Select Date --- ▽

Leave Type: --- Please Select One --- ▽
Annual Leave
Medical Leave
Unpaid Leave
Business Travel Comments:

CANCEL    SUBMIT

| Employee Name | Org. Name | Location | Employee Type | Direct Manager | 06/01/11 | 06/02/11 | 06/03/11 | 06/04/11 | 06/05/11 | 06/06/11 | 06/07/11 | 06/08/11 |
|---|---|---|---|---|---|---|---|---|---|---|---|---|
| Alpha, Joe | Div. 1 | USA | Employee | John Smith | | | | | | | | |
| Beta, Jane | Div. 2 | INDIA | Contractor | Jean Doe | | 8 | | | | | | 8 |
| Chi, Jonathan | Div. 1 | USA | Employee | Jeff Kappa | | | 8 | | | | | |
| Delta, Jennifer | Div. 4 | INDIA | Employee | June Jones | | | | | | | | |
| Digamma, Jacob | Div. 2 | USA | Employee | Jean Doe | | | | | | | | 8 |
| Epsilon, Joshua | Div. 1 | USA | Employee | John Smith | | | | | | | | |
| Eta, James | Div. 1 | USA | Contractor | Jeff Kappa | | | | | | | | |

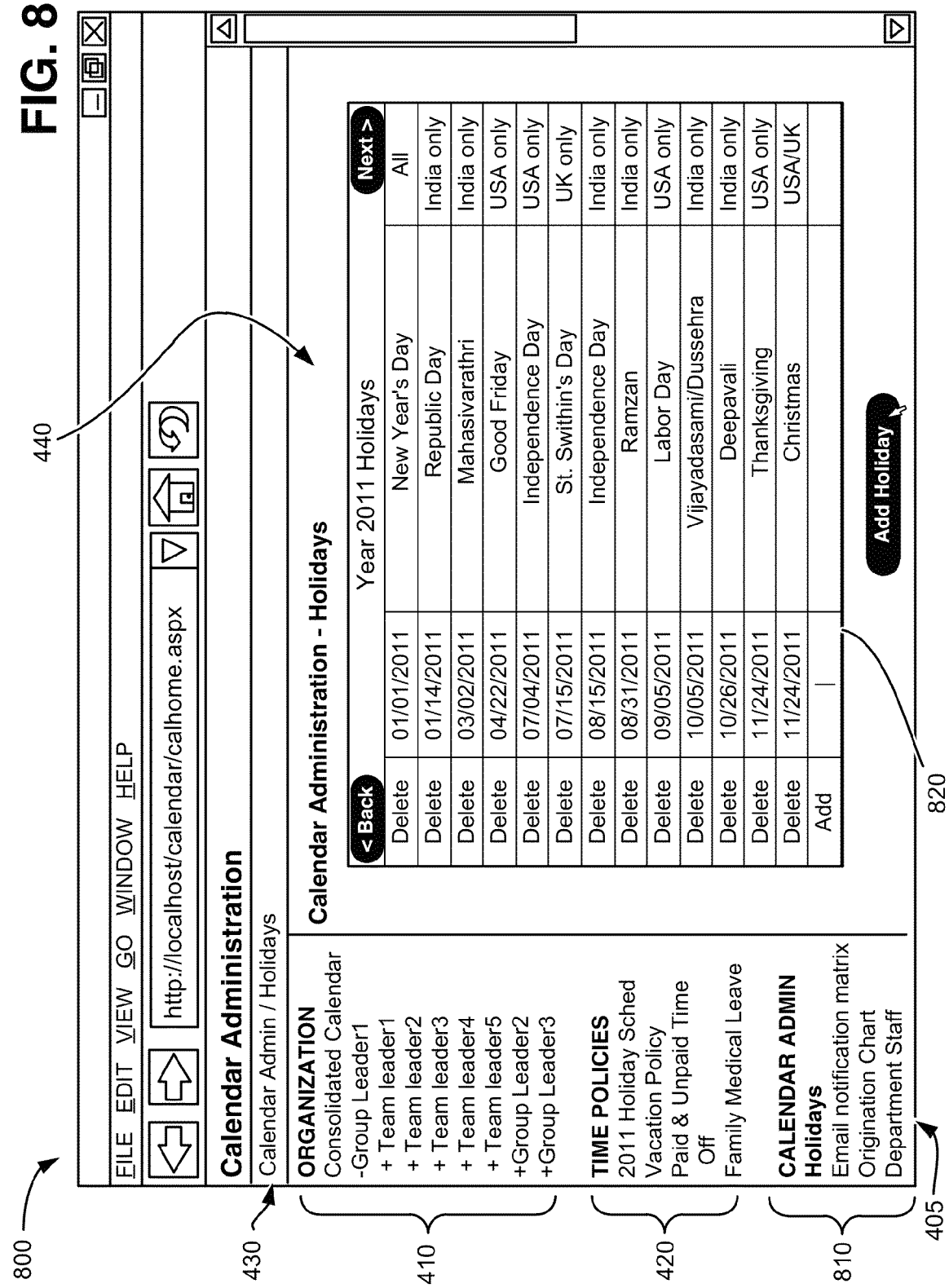

US 8,886,732 B2

OUT-OF-OFFICE CALENDAR AGGREGATOR

BACKGROUND INFORMATION

In any type of large organization, and particularly when a workforce is distributed across multiple locations, keeping track of individuals' availability (e.g., due to scheduled and unscheduled leave, business trips, telecommuting, etc.) is an essential business function. Managers may rely on employee availability information, for example, to schedule and project deadlines, commit resources, assign workflow, etc. There are many ad hoc systems for tracking whether employees are available during traditional business hours. However, such systems often require continual updating and may not provide flexibility to track employee availability at multiple organizational levels.

BRIEF DESCRIPTION OF THE DRAWINGS

FIG. 6 is an exemplary user interface for an out-of-office notification form according to an implementation herein;

FIG. 7 is an exemplary data table for a consolidated out-of-office calendar according to an implementation herein;

FIG. 8 is an exemplary calendar administration interface for holidays according to an implementation herein;

DETAILED DESCRIPTION OF PREFERRED EMBODIMENTS

The following detailed description refers to the accompanying drawings. The same reference numbers in different drawings may identify the same or similar elements.

Systems and/or methods described herein may provide an interactive web-based calendar system to collect, compile, manage, and provide notifications for out-of-office events. The systems and/or methods may present calendar aggregations for particular groups and sub-groups within an organization and may provide mechanisms to export data from the calendar to sortable file formats. The systems and/or methods may also provide a convenient user interface for an employee to submit an out-of-office notification and may provide automatic notifications of new out-of-office events to other individuals (e.g., managers) in the organizational hierarchy.

In one implementation, a computing device may receive configuration data for out-of-office calendar events and information for a particular employee out-of-office event. In response to the receiving the information for the employee out-of-office event, the computing device may generate a notification message for a manager, the notification message being based on the configuration data and the information for the employee out-of-office event. The computing device may also receive a request to present an out-of-office calendar for a portion of an organization associated with the employee and may send, to a user device, a calendar with the stored information (e.g., for the employee out-of-office event and other out-of-office events) that is responsive to the request to present the out-of-office calendar.

As used herein, the term "out-of-office event" may refer to a scheduled or unscheduled period for which an employee is unavailable or partially unavailable during a normal availability period for that employee. An out-of-office event may include for example, a vacation, medical leave, travel, training sessions, ad hoc telecommuting, etc. for a particular duration.

Figure 1:
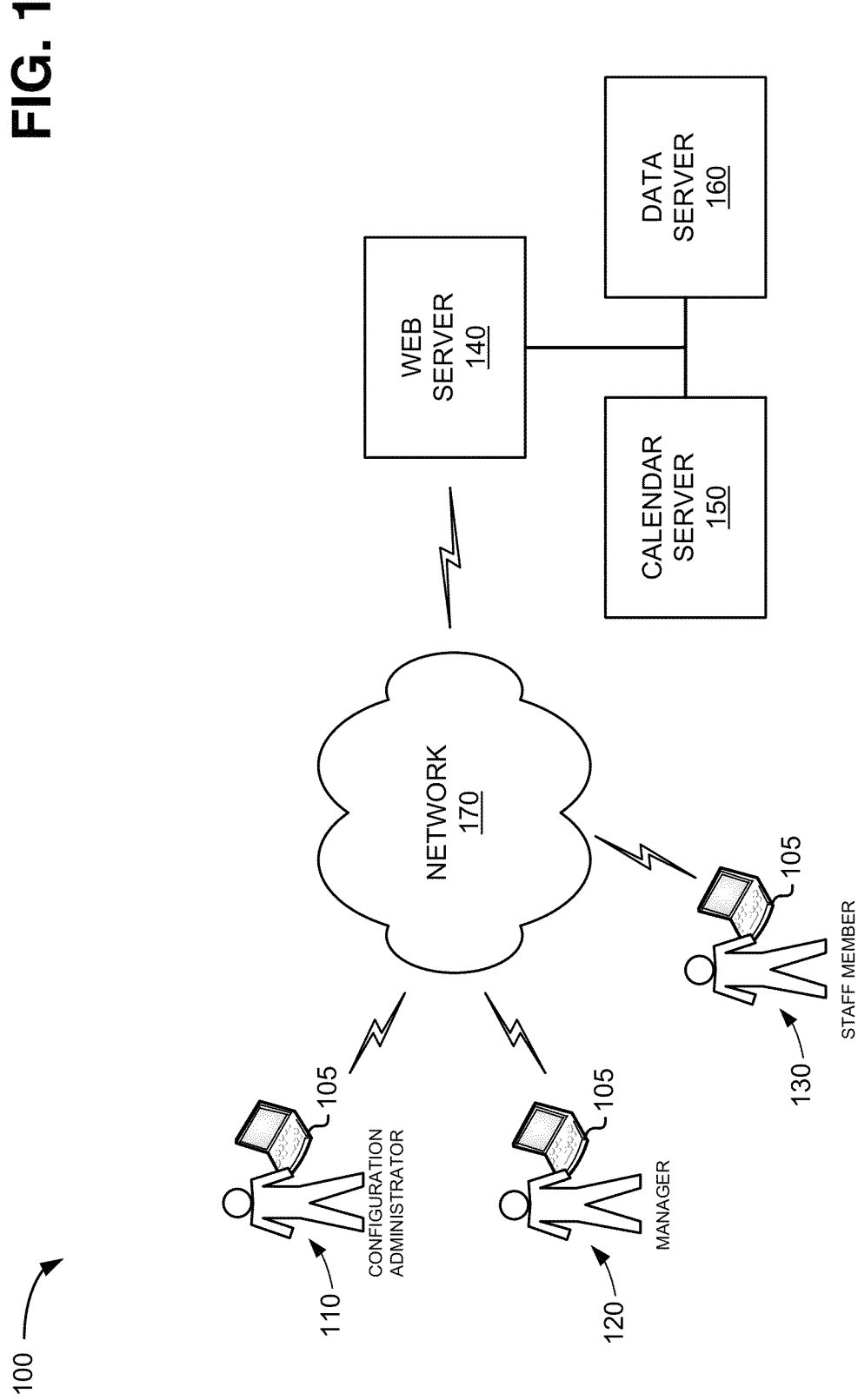
FIG. 1 depicts an exemplary network in which systems and/or methods described herein may be implemented.

FIG. 1 is a diagram of an exemplary network 100 in which systems and/or methods, described herein, may be implemented. Network 100 may include multiple components to facilitate out-of-office calendar entries and notifications. As shown in FIG. 1, network 100 include user devices 105, a configuration administrator 110, a manager 120, a staff member 130, a web server 140, a calendar server 150, and a data server 160 interconnected by a network 170. One of user devices 105 may be associated with each of configuration administrator 110, manager 120, and staff member 130. Configuration administrator 110, manager 120, and staff member 130 may generically be referred to herein as "users" or "employees." Components of network 100 may be connected via wired and/or wireless links.

User device 105 may include a personal computer, a laptop, a personal communications system (PCS) terminal (e.g., a smartphone that may combine a cellular radiotelephone with data processing and data communications capabilities), a personal digital assistant (PDA) (e.g., that can include a radiotelephone, a pager, Internet/intranet access, etc.), a tablet or "pad" computer, a radiotelephone, or other types of computation or communication devices. In one implementation, user device 105 may include any device that is capable of accessing a web-based application (e.g., provided by web server 140 and/or calendar server 150) that enables a user of user device 105 to submit, review, edit, etc., a calendar entry.

Configuration administrator 110, manager 120, and staff member 130 may be users of one or more user devices 105 capable of communicating over network 170 to provide information to, and receive information from, web server 140 and/or calendar server 150. Configuration administrator 110, manager 120, and staff member 130 may connect to network 170 via one or more of user devices 105. In one implementation, configuration administrator 110, manager 120, and staff member 130 may use the same user device 105 but have different access accounts. For example, a user may be provided with a user name and password that allows the user to access stored information from a server (such as calendar server 150) according to the rights (e.g., administrator rights, manager rights, staff member rights, etc.) granted with the account. As used herein, the terms "user" and "users" are intended to be broadly interpreted to include user device 105 and a user of a user device (e.g., configuration administrator 110, manager 120, and staff member 130).

Web server 140 may include one or more server devices, or other types of computation or communication devices, that gather, process, search, and/or provide information in a manner described herein. In one implementation, web server 140 may facilitate submission and/or retrieval of calendar information between user device 105 and calendar server 150. Web server 140 may dynamically generate web pages for each user device 105 accessing web server 140. In one implementation, web server 140 may provide an interface to a services portal that allows for access to multiple services (e.g., facilitated by multiple servers including calendar server 150). For example, web server 140 may provide an account login for a user to access multiple services, including calendar services provided by calendar server 150.

Calendar server 150 may include one or more server devices, or other types of computation or communication devices, that gather, process, search, and/or provide information in a manner described herein. Calendar server 150 may, for example, receive calendar data from user devices 105, manage calendar data for multiple users, generate calendars for viewing, generate calendar spreadsheets, and/or generate notifications for out-of-office events. In one implementation, calendar server 150 may communicate with web server 140 and/or data server 160 to perform requested calendar functions. Further details of calendar server 150 are provided below, for example, in connection with FIGS. 2 and 3.

Data server 160 may include processing logic and one or more data repositories (e.g., databases) that may include one or more sets of data to assist calendar server 150 in generating calendars, spreadsheets, and/or notifications. For example, data server 160 may include out-of-office event data, user data, calendar data, contact information, organization information, etc. Data from data server 160 may be provided from and/or retrieved by calendar server 150 based on inputs from users.

Network 170 may include a local area network (LAN), a wide area network (WAN), a metropolitan area network (MAN), an intranet, the Internet, or a combination of networks. In one implementation, network 170 may serve as communication tool between web server 140 and user devices 105 of configuration administrator 110, manager 120, and staff member 130. In another implementation, network 170 may also connect web server 140 to calendar server 150 and/or data server 160.

Although FIG. 1 shows exemplary components of network 100, in other implementations, network 100 may contain fewer components, different components, differently arranged components, or additional components than depicted in FIG. 1. For example, two or more of web server 140, calendar server 150, and data server 160 may be combined in a single device. In still other implementations, one or more components of network 100 may perform one or more other tasks described as being performed by one or more other components of network 100.

Figure 2:
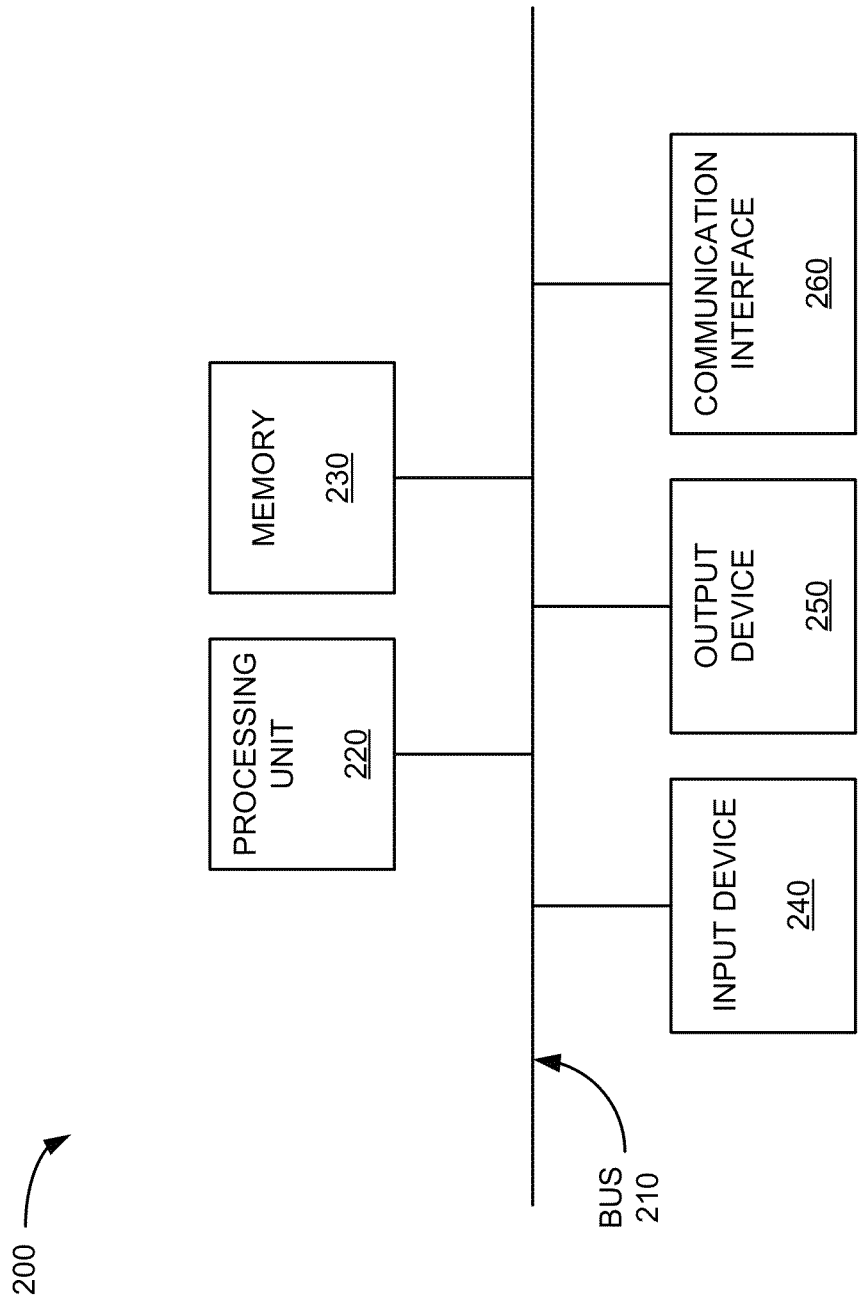
FIG. 2 is a diagram of an exemplary device that may be used in the network of FIG. 1.

FIG. 2 is an exemplary diagram of a device 200 that may correspond to any of user devices 105, web server 140, calendar server 150, or data server 160. Each of user devices 105, web server 140, calendar server 150, or data server 160 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for execution by processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, or the like. Output device 250 may include a device that outputs information to the operator, such as a display, a speaker, etc.

Communication interface 260 may include a transceiver (e.g., a transmitter and/or receiver) that enables device 200 to communicate with other devices and/or systems. For example, communication interface 260 may include mechanisms for communicating with other devices, such as other devices of network 100 or another device 200.

As described herein, device 200 may perform certain operations in response to processing unit 220 executing software instructions contained in a computer-readable medium, such as memory 230. A computer-readable medium may include a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
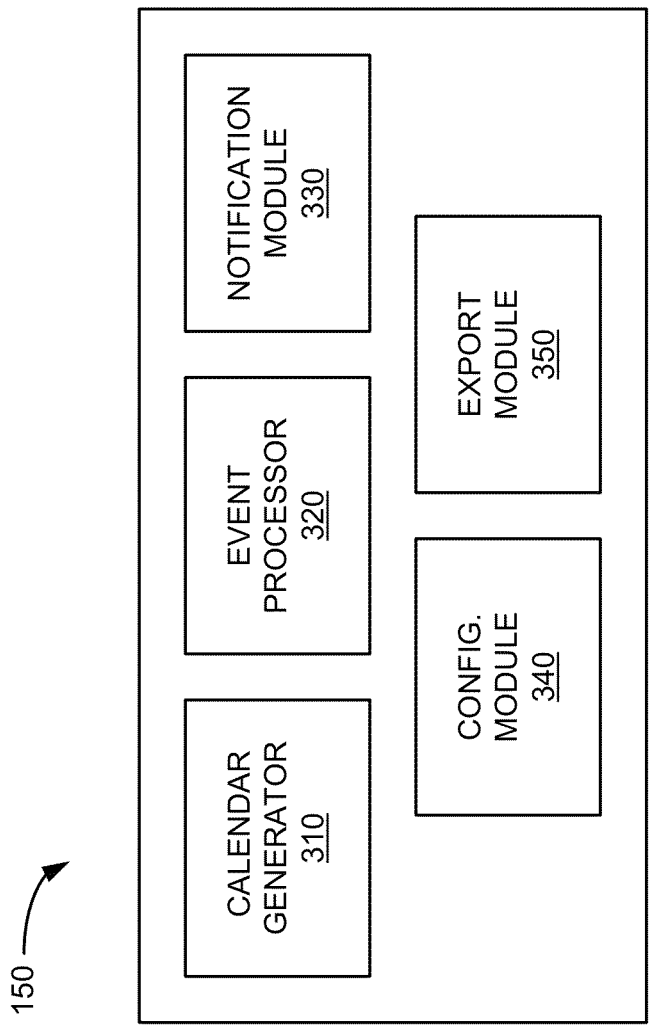
FIG. 3 is a block diagram illustrating exemplary components of the calendar server of FIG. 1.

FIG. 3 provides a block diagram illustrating exemplary functional components of calendar server 150. The functional components illustrated in FIG. 3 may be implemented by hardware or a combination of hardware and software, such as processing unit 220 executing instructions from memory 230. In one implementation, calendar server 150 may include a calendar generator 310, an event processor 320, a notification module 330, a configuration module 340, and an export module 350.

Calendar generator 310 may create calendars for particular users (e.g., for a particular configuration administrator 110, manager 120, or staff member 130). For example, calendar generator 310 may receive (e.g., from user device 105 via web browser 140) a request to view an employee availability calendar (e.g., an out-of-office calendar). In response to the request, calendar generator 310 may retrieve calendar data (e.g., from data server 160) associated with a particular user that initiated the request (e.g., based on a user's login account and/or organization information associated with the user). In one implementation, calendar generator 310 may apply the calendar data to a calendar template to provide a calendar for the particular user. A user may select, for example, among multiple templates/formats in which calendar data may be presented. In one implementation, a user may selectively configure the calendar to present only particular type of data. Examples of calendars that may be generated by calendar generator 310 are described further below in connection with FIGS. 4 and 5.

Event processor 320 may solicit, receive, and store out-of-office notification data from users. For example, event processor 320 may receive (e.g., from user device 105 via web browser 140) a request to submit an out-of-office notification. In response to the request, event processor 320 may provide a form to enable a user to input a new out-of-office notification or to change an existing notification. Examples of out-of-office notification forms that may be presented by event processor 320 are described further below in connection with FIG. 6. A user may input notification information using the form and may submit the form to event processor 320. Based on the information in the form, event processor 320 may store the notification information (e.g., in data server 160) and may send a signal to notification module 330 that a new/modified notification event has been received.

Notification module 330 may generate messages to synchronize local calendars with new/modified notification events received by event processor 320. For example, notification module 330 may receive information from event processor 320 about a newly received out-of-office notification. In addition, if an employee changes or deletes a previously entered out-of-office event, event processor 320 may also provide information to notification module 330. In response to the new or changed out-of-office event, notification module 330 may identify configuration information (e.g., from data server 160) that associates the individual submitting the notification (e.g., staff member 130) with one or more reporting managers (e.g., manager 120) for the individual.

Notification module 330 may then generate synchronization messages (e.g., an email message, a calendar invitation, etc.) for each reporting manager that may cause the individual's out-of-office notification to be included in a local personal information manager application (e.g., Microsoft Outlook™, Lotus Notes™, Google Calendar™, etc.). For example, notification module 330 may assemble an automatically generated email or other notification message that includes the name, date, and other information associated with the out-of-office event. The automatically generated email may be created based on a web application framework, such as ASP.NET, and a scripting language, such as Java Script. In one implementation, the synchronization message may include a calendar data exchange file, such as an iCalendar (.ics) file in compliance with IETF RFC 5545. The calendar data exchange file may cause the manager's personal information manager application (e.g., residing on user device 105) to add the out-of-office event (e.g., for staff member 130) to a personal calendar for the reporting manager.

In one implementation, the synchronization message and/or calendar exchange file may include reminder settings to automatically alert the reporting manager of a pending out-of-office event. The reminder settings may be configured based on the preference of the manager to override, for example, default reminder settings of a personal information manager application. For example, the reminder settings may be configured to provide automatic reminders at least one business day prior to the out-of-office event (e.g., to give the manager time to account for an employee absence). Synchronization message recipients, message formats, and reminder settings for individual managers may be configured, for example, based on a notification matrix. An example of a notification matrix that may be used by notification module 330 is described further below in connection with FIGS. 9 and 10.

Configuration module 340 may solicit, receive, and store calendar configuration data from authorized users (e.g., configuration administrator 110). For example, configuration module 340 may selectively provide (e.g., based on login account settings) links to configuration options for the out-of-office calendar. Configuration options may include, for example, holiday settings for particular countries/regions, manager notification settings, organization charts, etc. In one implementation, configuration module 340 may employ a Lightweight Directory Access Protocol (LDAP) connection with one or more other databases (e.g., a human resource database, training database, etc.) to populate calendar configuration data.

In response to selection of a link from an authorized user, configuration module 340 may provide an appropriate form to enable the user to input new configuration settings or to change existing configuration settings. Examples of configuration setting forms that may be presented by configuration module 340 are described further below in connection with FIGS. 8 and 9. A user may input notification information using the forms and may submit the forms to configuration module 340. Based on the information in the forms, configuration module 340 may store the configuration settings (e.g., in data server 160).

Export module 350 may extract calendar data to export. For example, export module 350 may extract calendar data from data server 160 for a particular group or subgroup. For example, export module 350 may extract data for a particular calendar view (e.g., a range of dates for a particular group within an organization) presented by calendar generator 310. In one implementation, export module 350 may format the exported data file for a particular application (e.g., a spreadsheet application). The exported data file may be used, for example, to plan project availability, holiday staffing, etc.

Although FIG. 3 shows exemplary functional components of calendar server 150, in other implementations, calendar server 150 may include fewer, different, differently-arranged, or additional functional components than depicted in FIG. 3. For example, calendar server 150 may include components to synchronize/retrieve login account information from other servers (e.g., web server 140). Alternatively, or additionally, one or more functional components of calendar server 150 may perform one or more other tasks described as being performed by one or more other functional components of calendar server 150.

Figure 4:
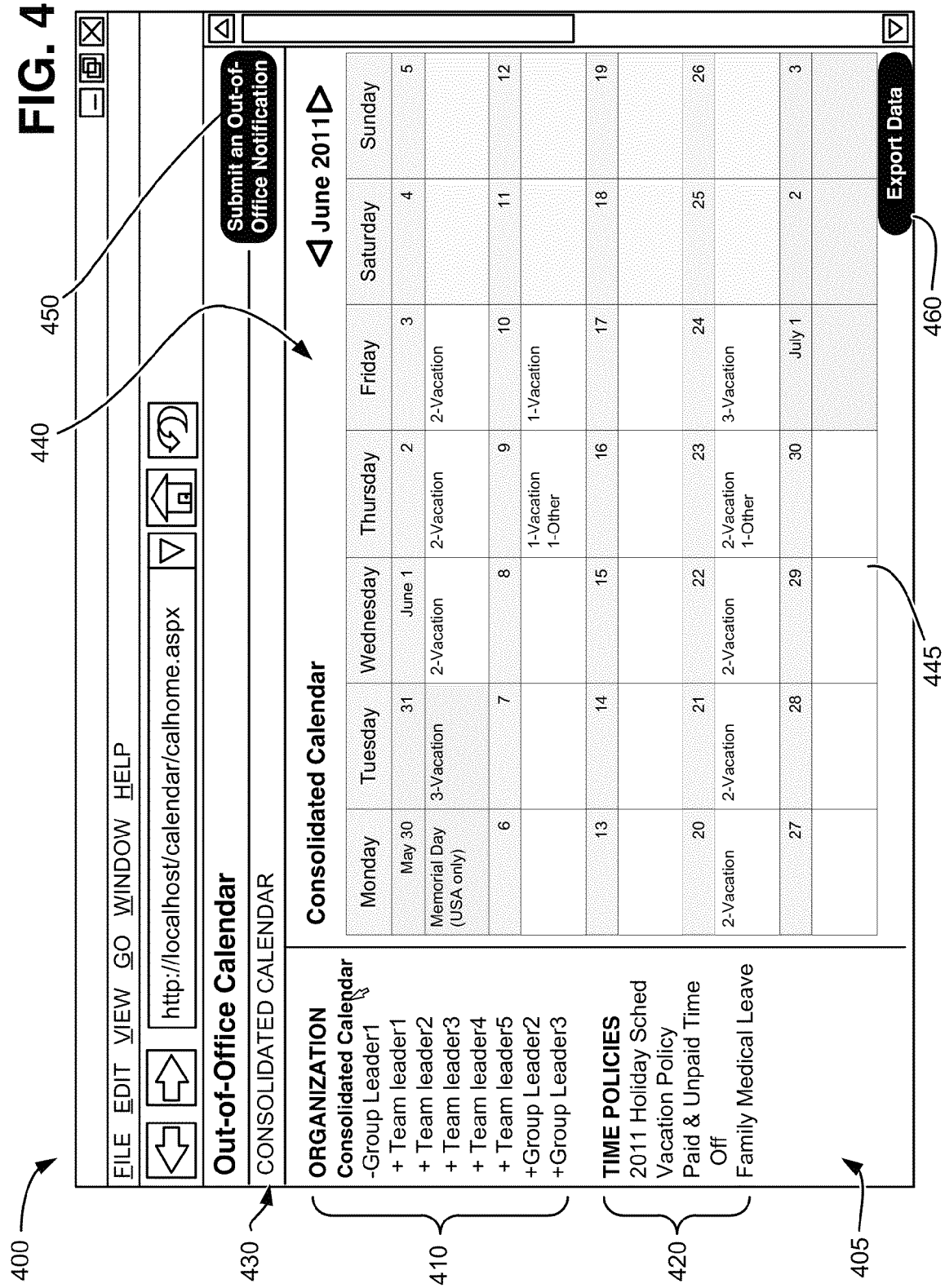
FIG. 4 is an exemplary user interface for a consolidated out-of-office calendar according to an implementation herein.

FIG. 4 provides a sample user interface 400 for a consolidated out-of-office calendar according to an implementation herein. User interface 400 (and other user interfaces disclosed herein) may be generated by web server 140 and/or calendar server 150 and presented to a user, for example, via a web browser application associated with one of user devices 105. As shown in FIG. 4, user interface 400 may include a navigation section 405 that includes a data selection menu 410 and a policy menu 420, a navigation tracking section 430, a presentation section 440 that includes a calendar 445, an out-of-office notification button 450, and an export data button 460.

Navigation section 405 may include hyperlinks (or links) to allow a user of user interface 400 to selectively view information related to an out-of-office calendar. Information presented in navigation section 405 may vary, for example, based on account privileges of a particular user. For example, while data selection menu 410 and policy menu 420 are shown in user interface 400, other menus may be included for users with different access privileges. Also, links within data selection menu 410 and/or policy menu 420 may differ for users with different access privileges.

Data selection menu 410 may include groupings of calendar information that may be selected by a user. For example, data selection menu 410 may include an organizational structure that may sort calendar data (e.g., from data server 160) based on particular management hierarchies. Data selection menu 410 may include expandable sections to enable a user to "drill down" to a particular group or sub-group within an organization. In one implementation, groupings in data selection menu 410 may be linked to an organizational structure extracted from another database, such as an employee database.

Selection (e.g., by a user of user device 105) of a particular category of data selection menu 410 may cause calendar server 150 (e.g., calendar generator 310) to present, in presentation section 440, calendar 445 with particular out-of-office information associated with the selected category. In one implementation, as shown in FIG. 4, user interface 400 may include a default setting to display calendar 445 as a consolidated calendar that includes a an overview of a highest organization level for which a particular user is given access. In other implementations, user interface 400 may default to the most recently-viewed data selection menu 410 selection for calendar 445.

Policy menu 420 may include groupings of policy information that may be selected by a user. For example, policy menu 420 may include links to policies that may be viewed by a user. Selection (e.g., by a user of user device 105) of a particular category of policy menu 420 may cause calendar server 150 (e.g., calendar generator 310) to present, in presentation section 440 (e.g., in place of calendar 445), particular policy information associated with the selected category. Policy information may generally include, for example, holiday schedules, vacation policies, paid and unpaid time off policies, medical leave policies, etc. In one implementation, display of policy information may be tailored to a particular user (e.g., based on a user's login account). For example, only policy information relevant to the particular user's geographic region may be displayed.

Navigation tracking section 430 may include information and/or links to identify a user's location within a navigational hierarchy of user interface 400. In other implementations, navigation tracking section 430 may indicate a navigation history (e.g., a "breadcrumb trail") of a particular user of user interface 400.

Presentation section 440 may include space for information corresponding to a selection of a link in navigation section 405. For example, presentation section 440 may include calendars, policy information, or administrative tools. As shown in FIG. 4, presentation section 440 may include a calendar template with data corresponding to a selected link in data selection menu 410. Thus, a user's selection of the "Consolidated Calendar" option from data selection 410 may cause calendar server 150 (e.g., calendar generator 310) to present calendar 445 that includes a summary of out-of-office data for the highest organizational level included in data selection menu 410. For example, for a given day, calendar 445 may include a summary of vacation information (e.g., "2-Vacation" on June 1, indicating that two employees/personnel are on vacation), rather than a listing of particular people that may be scheduled for vacation on that day. In one implementation, calendar server 150 may provide a link to cause particular individuals associated with the summary of vacation information (e.g., "2-Vacation" on June 1) to be shown or identified by selecting the summary of vacation information or performing a "mouse over" of the summary of vacation information. Information presented in calendar 445 may change, for example, based on a user's selection of another group within data selection 410. For example, FIG. 5 provides another sample user interface 500 for a consolidated out-of-office calendar.

Figure 5:
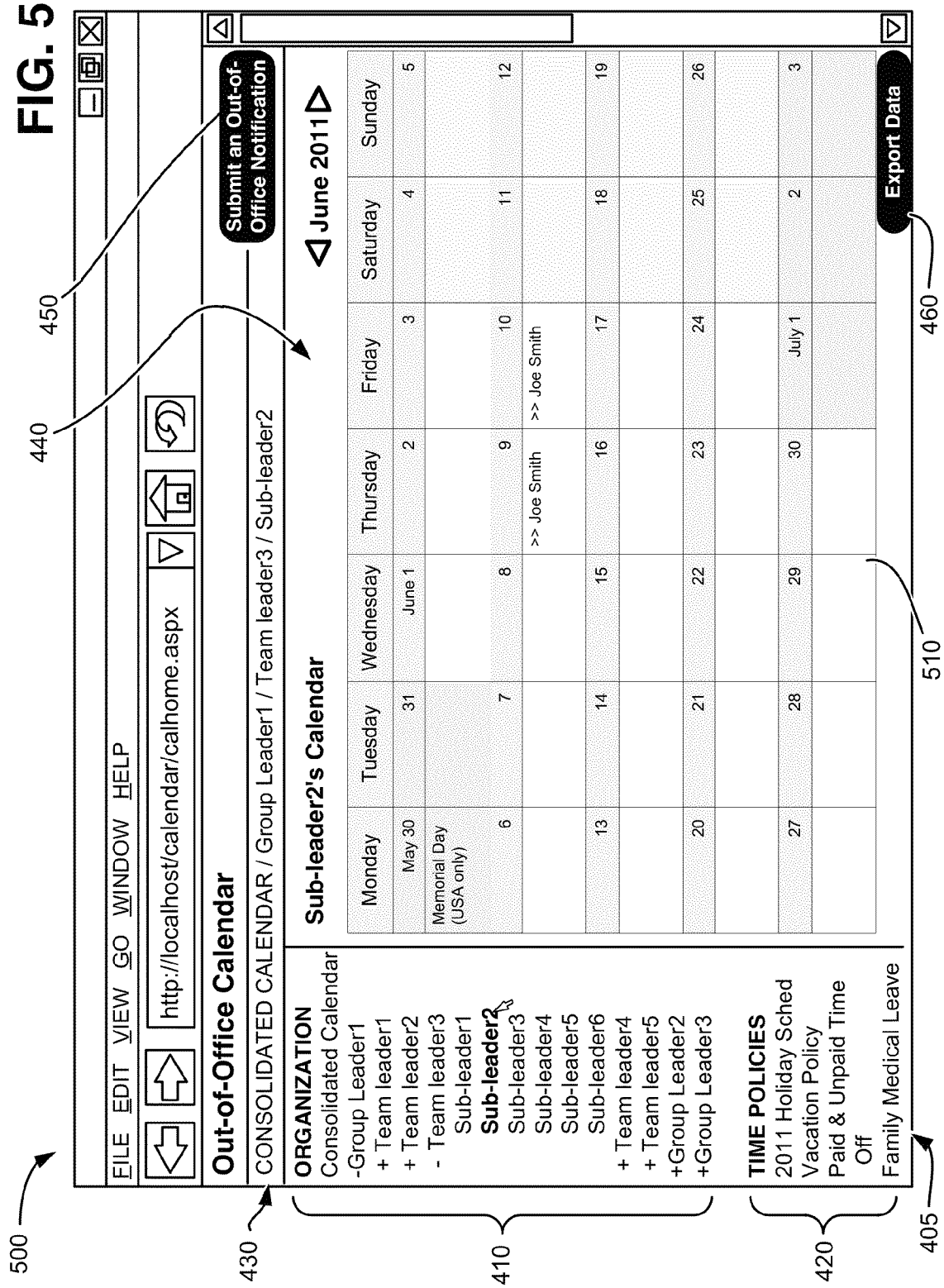
FIG. 5 is another exemplary user interface for a consolidated out-of-office calendar according to an implementation herein.

Particularly, FIG. 5 shows user interface 500 with data selection menu 410 being expanded to disclose links to additional sub-groups within the organization. As shown in FIG. 5, selection (e.g., by a user of user device 105) of a particular category (e.g., "sub-leader2") of data selection menu 410 may cause calendar server 150 (e.g., calendar generator 310) to present, in presentation section 440, calendar 510 with particular out-of-office information associated with the particular category. For example, calendar 510 may include availability information for staff members within the organizational structure defined under "Group Leader1," "Team leader3," and "Sub-leader2." Furthermore, navigation tracking section 430 may be updated to reflect the user's location within the navigational hierarchy.

In one implementation each name on calendar 510 (e.g., "Joe Smith") may include a link, such that selection (by a user) of the link may cause calendar server 150 to provide in user interface 500 the personal calendar of the employee that will be unavailable (e.g., "Joe Smith").

Returning to FIG. 4, user interface 400 may also include out-of-office notification button 450 to provide a link to a form for a user to submit notification of an out-of-office event. For example, a user's selection of out-of-office notification button 450 may cause calendar server 150 (e.g., event processor 320) to present another user interface (e.g., an out-of-office notification form) to receive details of a planned absence. A sample out-of-office notification form is described further in connection with FIG. 6.

As shown in FIG. 6, a user interface 600 may present an out-of-office notification form 610. In one implementation, out-of-office notification form 610 may be presented as a "pop-up" window to maintain continuity with an underlying user interface. Out-of-office notification form 610 may include a variety of input fields to solicit input from a user. Input fields may include, for example, an employee name (e.g., of staff member 130), a sub-group or manager for the employee, a defined time period for the out-of-office event, a leave category (e.g., annual leave, medical leave, unpaid leave, business travel, etc.), and/or a comments section. Input fields for out-of-office notification form 610 may use drop-down menus, radio buttons, open text, and/or other formats to solicit user input. In one example, data available for selection in fields of out-of-office notification form 610 may be pre-populated with options based on the user's account privileges. Upon submission of a completed out-of-office notification form 610, calendar server 150 (e.g., event processor 320) may save the new data in data server 160 and may initiate (e.g., via notification module 330) notifications to appropriate managers (e.g., manager 120).

Returning again to FIG. 4, export data button 460 may cause calendar server 150 (e.g., export module 350) to export calendar data. In one implementation, selection by a user of export data button 460 may cause export module to present another user interface (not shown) to specify criteria (e.g., a date range, a particular group, a data format, etc.) for the exported data. In another implementation, selection by a user of export data button 460 may cause export module 350 to export data corresponding to the particular view in shown in calendar 445. A sample of data that may be exported using export data button 460 is described further in connection with FIG. 7.

FIG. 7 includes a portion 700 of an exemplary data table for a consolidated out-of-office calendar. The data table may be generated, for example, by calendar server 150 based on information from data server 160. Data table portion 700 may include an employee name field 710, an organization name field 720, a location field 730, an employee type field 740, a direct manager field 750, date fields 760, and a variety of entries 770 corresponding to fields 710-760.

Employee name field 710 may include a name of an employee, such as configuration administrator 110, manager 120, or staff member 130, that may have access to a consolidated out-of-office calendar and/or out-of-office notification form 610.

Organization name field 720 may include an organization name, a direct report (e.g., a manager's name), or another designation within a corporate structure with which a corresponding person in employee name field 710 is associated. While a single organization name field 720 is included in data table portion 700, in other implementations, multiple organization fields may be included, such as a division, a sub-division, and a grouping within a sub-division.

Location field 730 may include a general region and/or time zone associated with a corresponding person in employee name field 710. Information in location field 730 may be linked to, for example, national holidays and/or general hours of operation for the location of a particular employee.

Employee type field 740 may include an indication of an employee's contractual relationship with an employer (e.g., employee, contractor, etc.). Direct manager field 750 may include an indication of a first-line manager for a corresponding person in employee name field 710.

Date fields 760 may include available dates for which employees may provide an out-of-office (or otherwise unavailable) notification. Entries 770 in date fields 760 may be populated, for example, based on entries in out-of-office notification form 610. In one implementation, entries 770 in date fields 760 may include a number of hours (e.g., "8") of leave time. In other implementations, entries 770 in date fields 760 may include other leave indicators, such an "x" for a full day notification, a "½" (or another fraction) for partial day notification, etc. In one implementation, calendar server 150 may shift notifications to reflect a region or time zone of a local manager (e.g., a manager for which the data table is intended). For example, an out-of-office notification for an employee in Tokyo, Japan may be shifted forward one day to reflect an overlap with the business day of a manager in Los Angeles, Calif. Although particular dates are shown for date fields 760, in other implementations, a particular range of date fields to be included in data table portion 700 may be defined by a user.

Data table portion 700 may be provided in a searchable format to allow entries 770 to be sorted based on different fields 710-760. For example, entries 770 may be sorted based on organization name field 720 to facilitate man-hour planning for a particular project within an organization. Although FIG. 7 shows exemplary fields for data table portion 700, in other implementations, data table portion 700 may include fewer, different, differently-arranged, or additional fields than depicted in FIG. 7.

FIG. 8 provides a sample user interface 800 for a consolidated out-of-office calendar according to another implementation herein. Sample user interface 800 may be presented to a user with administration privileges (e.g., configuration administrator 110) based on an account login. As shown in FIG. 8, user interface 800 may include navigation section 405 that includes data selection menu 410, policy menu 420, and a calendar administration section 810; navigation tracking section 430; and presentation section 440 that includes a holiday matrix 820. Navigation section 405, data selection menu 410, policy menu 420, navigation tracking section 430, and presentation section 440 may include features describe above in connection with, for example, FIG. 4.

As shown in FIG. 8, navigation section 405 may include calendar administration section 810. Calendar administration section 810 may include links to settings that may be viewed and/or altered by a user (e.g., configuration administrator 110 or another user with appropriate access privileges). For example, calendar administration section 810 may include a holidays list link, an email notification matrix link, an organization chart link, and a department staff link. As shown in FIG. 8, selection of the holidays list link may cause holiday matrix 820 to be presented in presentation section 440.

Holiday matrix 820 may include, for example, an interactive list of holidays for multiple regions associated with an organization and/or company. For example, holidays for India, the United States of America, and the United Kingdom may be included in a single holiday matrix 820 for a particular company. Holiday matrix 820 may include a variety of input fields to present information to and/or solicit input from a user. The input fields may include a delete section, a date section, a title section, and a region section associated with each holiday. A user may select an entry from any field to modify data in that field. Input fields for holiday matrix 820 may use drop-down menus, radio buttons, open text, and/or other formats to solicit user input. Holiday matrix 820 may also include navigation buttons (e.g., "back" and "next") to present holiday information for different time periods (e.g., different calendar years).

In one implementation, holiday matrix 820 may also include a selectable "add holiday" option to add a new holiday entry to holiday matrix 820. Although FIG. 8 shows exemplary fields for holiday matrix 820, in other implementations, holiday matrix 820 may include fewer, different, differently-arranged, or additional fields than depicted in FIG. 8.

Figure 9:
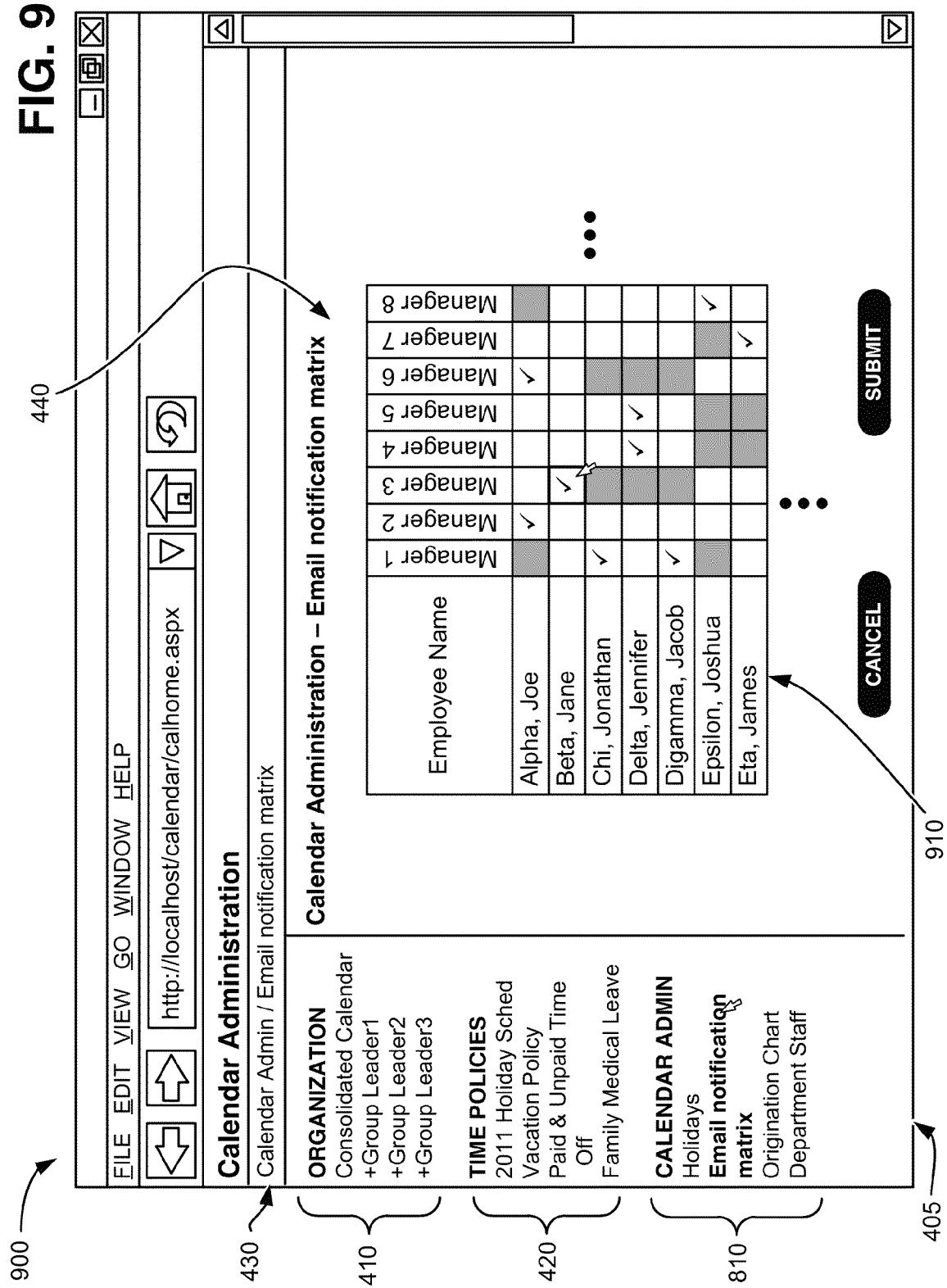
FIG. 9 is an exemplary calendar administration interface for notifications according to an implementation herein.

FIG. 9 provides another sample user interface 900 for a consolidated out-of-office calendar according to another implementation herein. User interface 900 include features similar to user interface 800 described above. Particularly, FIG. 9 shows user interface 900 with a selection of the email notification matrix link from calendar administration section 810. As shown in FIG. 9, selection of the email notification matrix may cause email notification matrix 910 to be presented in presentation section 440.

Email notification matrix 910 may include, for example, an interactive list of employees associated with an organization and managers with which each employee may be connected. For example, as shown in FIG. 9, each employee name in email notification matrix 910 may connected with one or more manager (e.g., "Manager 1," "Manager 2," etc.) that may receive automatic notifications when the employee provides an out-of-office notification (e.g., submits information in out-of-office notification form 610). In one implementation, an employee name may be associated with any manager (e.g., for purposes of out-of-office notifications) by selecting a grid box associated with the appropriate manager (e.g., Jane Beta may be connected with "Manager 3" by selection of the appropriate box).

In another implementation, only managers within a particular organizational hierarchy may be made available for connections with a particular employee. Thus, for a particular employee name in email notification matrix 910, calendar server 150 may limit selections to managers that have a direct or indirect organizational responsibility for that employee.

For example, grid boxes for manager selections that are not available for a particular employee name may be marked with gray scale or another indication that those grid boxes are not valid selections.

Employee names and managers in email notification matrix 910 may be populated with entries based on stored information in data server 160. For example, information associated with employee names (e.g., name, location, employee type, etc. associated with an employee) may be defined in a department staff chart (not shown) that may be accessed and/or edited, for example, via selection of the "department staff" link in calendar administration section 810. Each department staff member may be included in the employee name field. Additionally, organizational responsibilities may be defined in an organization chart (not shown) that may be accessed and/or edited, for example, via selection of the "organization chart" link in calendar administration section 810. Each manager in the organizational chart may be included in a separate manager field (e.g., "Manager 1," "Manager 2," etc.).

In one implementation, each manager field heading (e.g., "Manager 1," "Manager 2," etc.) may include a link to notification configuration settings for the particular managers. Thus, selection of, for example, "Manager 1" may cause calendar server 150 (e.g., notification module 330) to present another user interface to receive out-of-office notification preferences. A sample out-of-office notification preferences form is described further in connection with FIG. 10.

Figure 10:
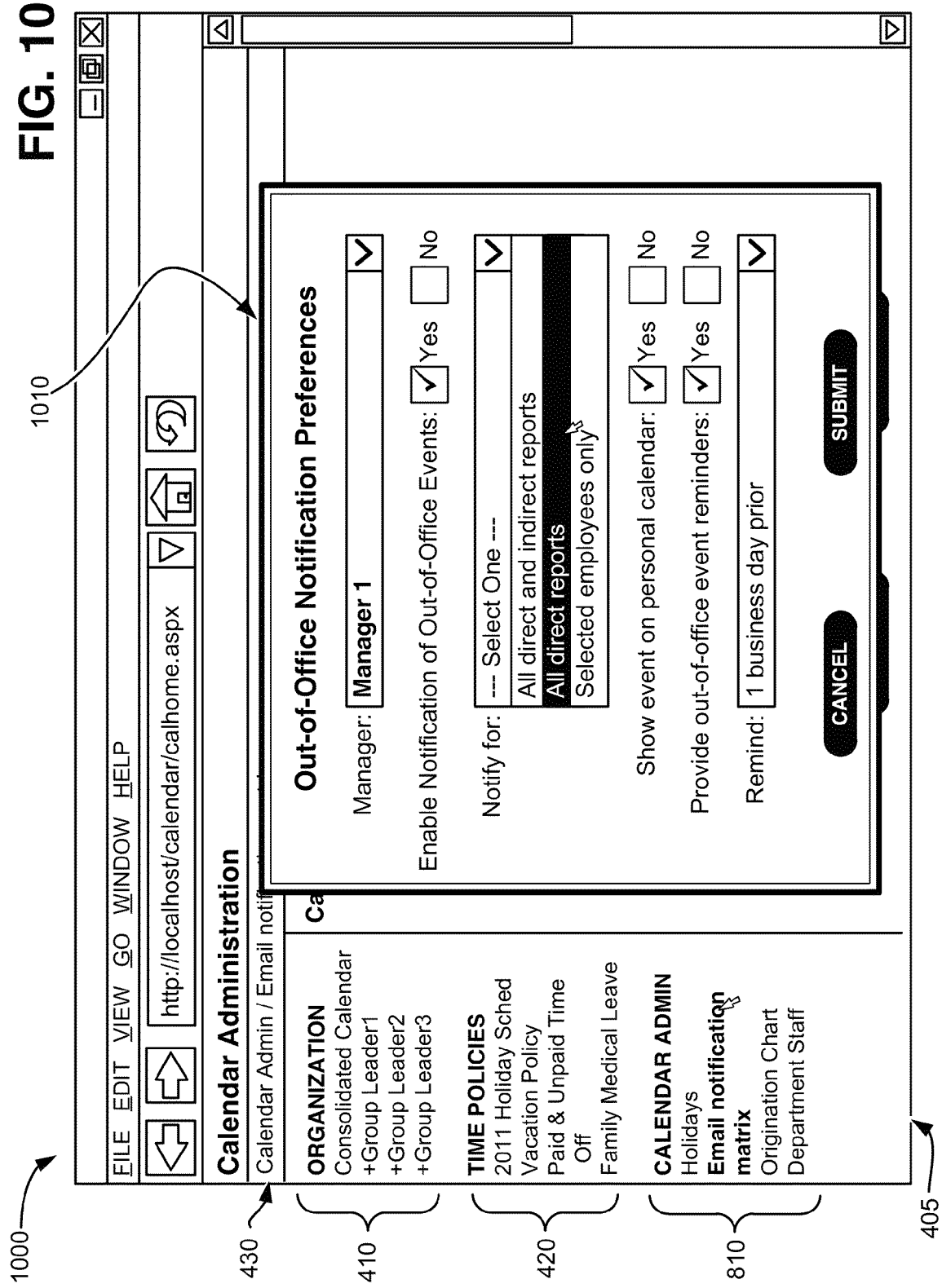
FIG. 10 is another exemplary calendar administration interface for notifications according to an implementation herein.

As shown in FIG. 10, a user interface 1000 may present an out-of-office notification preferences form 1010. In one implementation, out-of-office notification preferences form 1010 may be presented as a "pop-up" window to maintain continuity with an underlying user interface. Out-of-office notification preferences form 1010 may include a variety of input fields to solicit input from a user. Input fields may include, for example, manager name (e.g., of manager 120), an enable notification selection, a category of notifications (e.g., for all staff members reporting to the particular manager, particular staff members, all staff members, etc.), a show the out-of-office event on the manager's personal calendar option, a reminder option, and/or a reminder time option. Input fields for out-of-office notification preferences form 1010 may use drop-down menus, radio buttons, open text, and/or other formats to solicit user input. Upon submission of a completed out-of-office notification preferences form 1010, calendar server 150 (e.g., notification module 330) may save the new data in data server 160 and may conform subsequent notifications to the stored preferences.

Although FIGS. 9 and 10 shows exemplary user interfaces 900 and 1000, in other implementations, user interfaces 900 and 1000 may include fewer, different, differently-arranged, or additional information than depicted in FIGS. 9 and 10.

Figure 11:
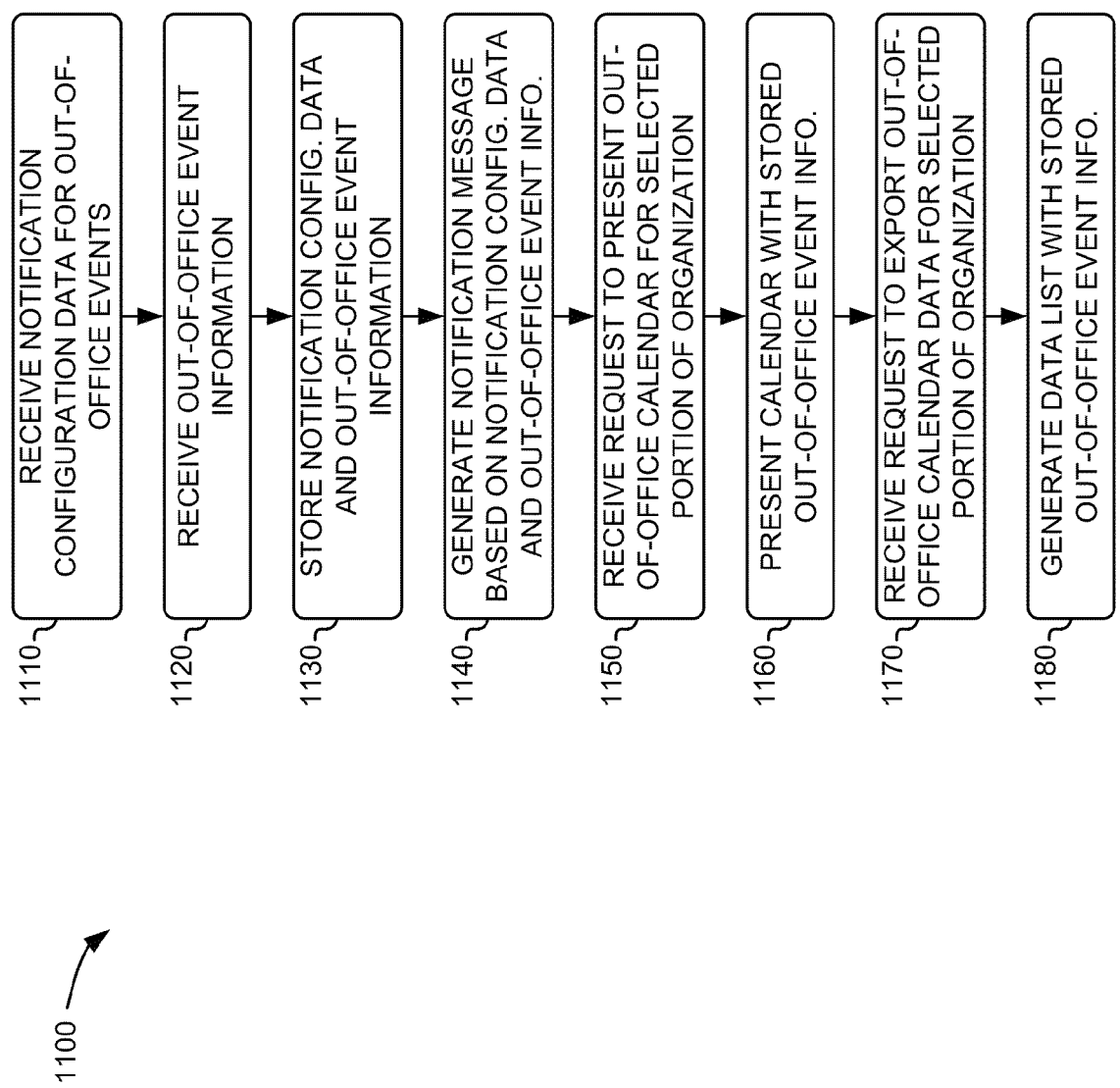
FIGS. 11 and 12 are flow charts illustrating exemplary operations for providing a consolidated out-of-office calendar according to an implementation herein.

FIG. 11 is a flow chart of an example process 1100 for implementing an out-off-office calendar according to implementations described herein. In one implementation, process 1100 may be performed by calendar server 150. In another implementation, some or all of process 1100 may be performed by another device or group of devices, including or excluding calendar server 150.

As shown in FIG. 11, process 1100 may include receiving notification configuration data for out-of-office events (block 1110). For example, in implementations described above in connection with FIG. 3, calendar server 150 (e.g., configuration module 340) may selectively provide (e.g., based on account settings for a particular user) links to configuration options for an out-of-office calendar. Configuration options may include, for example, manager notification settings. A user may select configuration options and provide (e.g., via user device 105 and web server 140) an indication of the selected options to calendar server 150. In response to selection of a link from an authorized user, calendar server 150 may provide an appropriate form, such as email notification matrix 910 of FIG. 9, to enable the user to input new configuration settings or to change existing configuration settings. A user may input notification information (e.g., via user device 105) using the forms and may submit the forms to calendar server 150 (e.g., configuration module 340).

Process 1100 may further include and receiving out-of-office event information (block 1120). For example, in implementations described above in connection with FIG. 3, calendar server 150 (e.g., event processor 320) may receive (e.g., from user device 105 via web server 140) a request to submit an out-of-office notification. In response to the request, calendar server 150 may provide a form, such as out-of-office notification form 610 of FIG. 6, to enable a user to input a new out-of-office notification or to change an existing notification. A user may input out-of-office event information (e.g., via user device 105) using the form and may submit the form to calendar server 150.

Process 1100 may also include storing the notification configuration data and the out-of-office event information (block 1130). For example, in implementations described above in connection with FIG. 3, calendar server 150 may store the notification configuration data and the out-of-office event information in data server 160 for future use.

Process 1100 may further include generating a notification message based on the notification configuration data and the out-of-office event information (block 1140). For example, in implementations described above in connection with FIG. 3, calendar server 150 (e.g., notification module 330) may receive out-of-office event information and, in response, may identify the notification configuration data (e.g., from data server 160) that associates the individual submitting the out-of-office event (e.g., staff member 130) with one or more reporting managers (e.g., manager 120) to be notified of the out-of-office event. Calendar server 150 may generate a synchronization message (e.g., an email message, a calendar invitation, etc.) for each reporting manager. The synchronization message may cause the individual's out-of-office event to be included in a local personal information manager application for the reporting manager. In one implementation, the synchronization messages may include reminder settings to automatically alert the reporting manager of the pending out-of-office event.

Process 1100 may further include receiving a request to present an out-of-office calendar for a selected portion of an organization (block 1150), and presenting a calendar with stored out-of-office event information based on the request (block 1160). For example, in implementations described above in connection with FIG. 3, calendar server 150 (e.g., calendar generator 310) may receive (e.g., from user device 105 via web browser 140) a request to view an employee availability calendar (e.g., an out-of-office calendar). In one implementation calendar server 150 may provide a user interface with a selection menu, such as data selection menu 410 of FIGS. 4 and 5, to enable a user to select a particular group or sub-group within an organization. The user's selection (e.g., via user device 105 using the form) may be submitted to calendar server 150. In response to the user's selection, calendar server 150 may retrieve calendar data (e.g., from data server 160 associated with the particular user that initiated the request (e.g., based on a user's login account and/or organization information associated with the user). In one implementation, calendar generator 310 may apply the calendar data to a calendar template to provide a calendar for the particular user.

Process 1100 may further include receiving a request to export the out-of-office calendar data for a selected portion of the organization (block 1170), and generating a data list with the stored out-of-office event information (block 1180). For example, in implementations described above in connection with FIG. 3, calendar server 150 (e.g., export module 350) may extract calendar data from data server 160 for a particular group or subgroup. For example, export module 350 may extract data for a particular calendar view (e.g., a range of dates for a particular group within an organization) presented by calendar generator. In on implementation, export module 350 may format the exported data file for a particular application (e.g., a spreadsheet application) that may be sorted or otherwise manipulated by a user.

Figure 12:
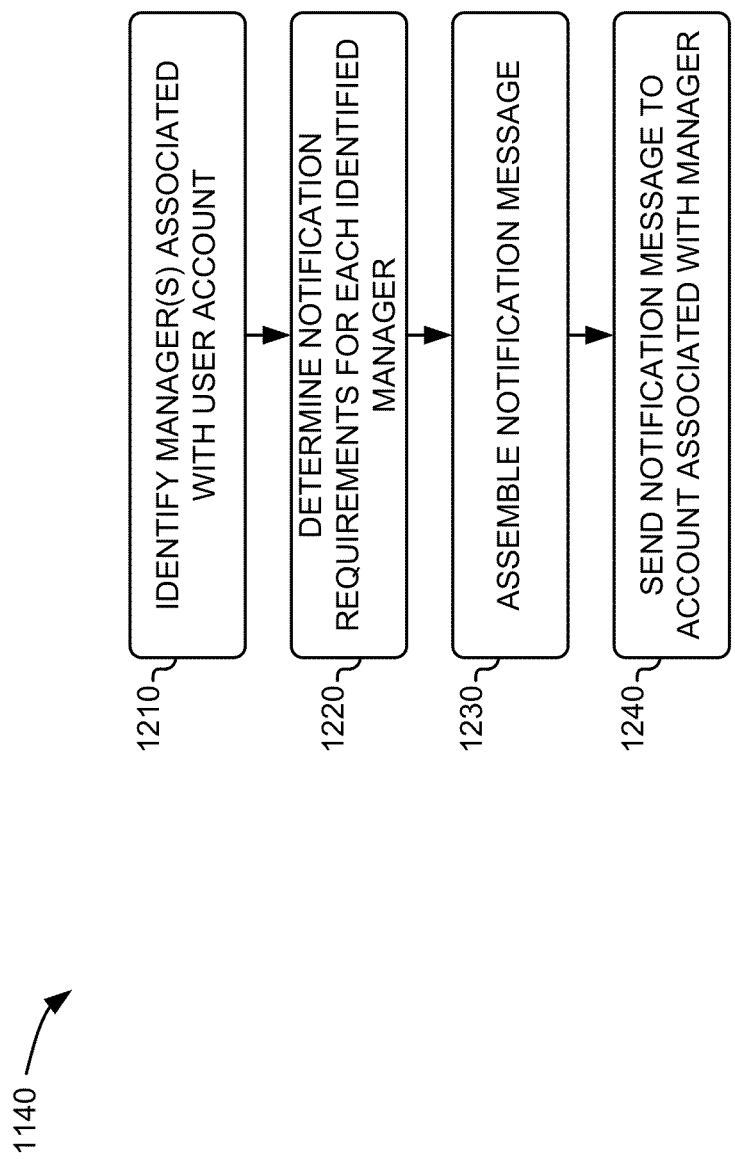

Process block 1140 described above may include the process blocks described in connection with FIG. 12. As shown in FIG. 12, process block 1140 may include identifying one or more managers associated with a user account (block 1210), determining notification requirements for each of the one or more managers (block 1220), assembling a notification message in a format for the manager's personal information management software (block 1230), and sending, to an account associated with the manager, the notification message (block 1240). For example, calendar server 150 may associate a user with managers (e.g., one or more managers 120) to notify based on notification matrix 910. Each manager may have different notification configurations which may be stored, for example, in data server 160. The notification requirements may be configured for each manager's preferences and/or personal information manager application(s). Calendar server 150 may retrieve the notification configuration settings and assemble a notification message that includes a calendar data exchange file. The calendar data exchange file may cause the manager's personal information manager application (e.g., residing on user device 105) to add an out-of-office event (e.g., for staff member 130) to a personal calendar for the manager. Calendar server 150 may send the assembled notification message to an email address (or another account address) associated with the manager (e.g., as indicated in the stored notification configuration for the manager).

Systems and/or methods described herein may provide an out-of-office aggregation calendar that may receive and compile out-of-office events from multiple users within an organization. The systems and/or methods may present calendar aggregations for particular groups and sub-groups within an organization and may provide mechanisms to export data from the calendar to sortable file formats. The systems and/or methods may provide a convenient user interface for an employee to submit an out-of-office notification and may provide automatic notifications to other individuals (e.g., managers) in the organizational hierarchy. The automatic notifications may also synchronize a manager's private calendar with relevant portions of the out-of-office aggregation calendar.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 11 and 12, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
receiving, by a computing device, configuration data for managing a calendar of out-of-office events for an organization, wherein the configuration data includes holiday settings, manager notification settings, and organizational settings;
receiving, by the computing device, information for multiple employee out-of-office events, wherein the information for each of the multiple employee out-of-office events includes an employee name, a defined time period for the out-of-office event, and a sub-group for the employee name;
storing, by the computing device, the configuration data and the information for the multiple employee out-of-office events;
receiving, by the computing device, a request to present an out-of-office calendar for a portion of the organization; and
sending, by the computing device and to a user device, a user interface for a calendar with the stored information for the multiple employee out-of-office events that is responsive to the request to present the out-of-office calendar,
wherein the user interface includes a data selection menu with an organizational structure that allows a user to select, based on the configuration data, a particular sub-group within the organization for which to present, on the calendar, particular employee out-of-office events, of the multiple employee out-of-office events, that are associated with the particular sub-group, and
wherein the calendar includes, for each given day on the calendar, a summary of employee out-of-office events, of the multiple employee out-of-office events, that are applicable to the particular sub-group, along with holidays that are applicable to employees of the particular sub-group.

2. The method of claim 1, further comprising:
identifying, based on the organizational settings, a manager associated with each of the multiple employee out-of-office events;
providing, based on the manager notification settings and in response to the receiving the information for the multiple employee out-of-office events, a notification message to each of the respective managers associated with each of the multiple employee out-of-office events; and
providing, at a time identified in the manager notification settings, a reminder, to each of the respective managers associated with each of the multiple employee out-of-office events, to indicate a pending out-of-office event.

3. The method of claim 2, wherein the notification message comprises an email message.

4. The method of claim 3, wherein the notification message comprises an email message with a calendar data exchange file.

5. The method of claim 2, wherein the notification message is configured to automatically add the employee out-of-office event to a personal calendar application.

6. The method of claim 1, further comprising:
receiving a request to export data, from the configuration data and the information for the multiple employee out-of-office events, for a portion of the organization associated with the employees of the particular sub-group; and
sending, by the computing device and to another user device, a data list with the stored information for the employee out-of-office event that is responsive to the request to export data.

7. The method of claim 1, further comprising:
providing, to the user device, another user interface to solicit the information for a particular employee out-of-office event of the multiple employee out-of-office events.

8. The method of claim 1, further comprising:
presenting a form to enable a user to input the configuration data, wherein the form includes an interactive list of employees associated with an organization and managers with which each employee is connected.

9. The method of claim 1, further comprising:
receiving information for another employee out-of-office event; and
storing the information for the other employee out-of-office event.

10. One or more computing devices, comprising:
a memory to store a plurality of instructions; and
a processor configured to execute instructions in the memory to:
receive, from a user device, configuration data for managing a calendar of out-of-office events for an organization, wherein the configuration data includes holiday settings, manager notification settings, and organizational settings,
receive, from another user device information for multiple employee out-of-office events, wherein the information for each of the multiple employee out-of-office events includes an employee name, a defined time period for the out-of-office event, and a sub-group for the employee name,
store, in the memory, the configuration data and the information for the multiple employee out-of-office events,
send, to a different user device, a calendar with the stored information for the multiple employee out-of-office events, wherein the calendar includes a user interface to request a data list including the employee out-of-office event,
wherein the user interface includes a data selection menu with an organizational structure that allows a user to select, based on the configuration data, a particular sub-group within the organization for which to present, on the calendar, particular employee out-of-office events, of the multiple employee out-of-office events, that are associated with the particular sub-group, and
wherein the calendar includes, for each given day on the calendar, a summary of employee out-of-office events, of the multiple employee out-of-office events, that are applicable to the particular sub-group, along with holidays that are applicable to employees of the particular sub-group.

11. The one or more computing devices of claim 10, wherein the processor is further configured to execute instructions in the memory to:
receive a request to export data, from the configuration data and the information for the multiple employee out-of-office events, for a portion of the organization associated with the employees of the particular sub-group; and
send the data list with the stored information for the employee out-of-office event that is responsive to the request to export data.

12. The one or more computing devices of claim 10, wherein the processor is further configured to execute instructions in the memory to:
identify, based on the organizational settings, a manager associated with each of the multiple employee out-of-office events;
provide, based on the manager notification settings and in response to the receiving the information for the multiple employee out-of-office events, a notification message to each of the respective managers associated with each of the multiple employee out-of-office events; and
provide, at a time identified in the manager notification settings, a reminder, to each of the respective managers associated with each of the multiple employee out-of-office events, to indicate a pending out-of-office event.

13. The one or more computing devices of claim 12, wherein the notification message comprises an email message.

14. The one or more computing devices of claim 12, wherein the notification message comprises an email message including a calendar data exchange file as an attachment to the email message.

15. The one or more computing devices of claim 12, wherein the notification message is configured to cause a user device associated with one of the respective managers to automatically add at least one of the multiple employee out-of-office events to a personal calendar application associated with the one of the respective managers.

16. The one or more computing devices of claim 10, wherein the processor is further configured to execute instructions in the memory to:
provide, to the other user device, a user interface to solicit the information for at least one of the multiple employee out-of-office events.

17. The one or more computing devices of claim 10, wherein the processor is further configured to execute instructions in the memory to:
receive information for another employee out-of-office event; and store, in the memory, the information for the other employee out-of-office event.

18. A non-transitory computer-readable memory comprising computer-executable instructions, the computer-readable memory comprising one or more instructions to:
   store configuration data for managing a calendar of out-of-office events for an organization, wherein the configuration data includes holiday settings for particular regions, manager notification settings, and organizational settings;
   receive, from a user device, information for multiple employee out-of-office events, wherein the information for each of the multiple employee out-of-office events includes an employee name, a defined time period for the out-of-office event, and a sub-group for the employee name;
   store the information for the multiple employee out-of-office events; and
   send, to a different user device, a calendar with the stored information for the multiple employee out-of-office events, wherein the calendar includes a user interface to request a data list including the employee out-of-office events,
   wherein the user interface includes a data selection menu with an organizational structure that allows a user to select, based on the configuration data, a particular sub-group within the organization for which to present, on the calendar, particular employee out-of-office events, of the multiple employee out-of-office events, that are associated with the particular sub-group, and
   wherein the calendar includes, for each given day on the calendar, a summary of employee out-of-office events, of the multiple employee out-of-office events, that are applicable to the particular sub-group, along with regional holidays that are applicable to employees of the particular sub-group.

19. The computer-readable memory of claim 18, further comprising one or more instructions to:
   provide, at a time prior to an out-of-office event identified in the manager notification settings, a reminder, to a manager associated with one of the multiple employee out-of-office events, to indicate a pending out-of-office event.

20. The computer-readable memory of claim 18, further comprising one or more instructions to:
   send, to another user device, a data list with the stored information for the employee out-of-office event.

* * * * *